United States Patent [19]
Gofuku et al.

[11] Patent Number: 5,269,868
[45] Date of Patent: Dec. 14, 1993

[54] METHOD FOR SEPARATING BONDED SUBSTRATES, IN PARTICULAR DISASSEMBLING A LIQUID CRYSTAL DISPLAY DEVICE

[75] Inventors: Eishi Gofuku; Hayato Takasago, both of Amagasaki, Japan

[73] Assignee: Mitsubishi Denki Kabushiki Kaisha, Tokyo, Japan

[21] Appl. No.: 975,136

[22] Filed: Nov. 12, 1992

Related U.S. Application Data

[63] Continuation of Ser. No. 581,902, Sep. 13, 1990, abandoned.

[30] Foreign Application Priority Data

Oct. 12, 1989 [JP] Japan .................................. 1-267036

[51] Int. Cl.$^5$ .............................................. B32B 35/00
[52] U.S. Cl. .................................. 156/344; 156/272.8; 156/643; 156/668; 359/80
[58] Field of Search ............... 156/272.2, 272.8, 273.5, 156/275.5, 344, 584, 643, 668; 359/80

[56] References Cited

U.S. PATENT DOCUMENTS

| | | | |
|---|---|---|---|
| 2,884,312 | 4/1959 | Kuryla | 156/344 |
| 3,411,971 | 11/1968 | Wood | 156/344 X |
| 3,735,911 | 5/1973 | Ward | 29/426.4 X |
| 3,885,072 | 5/1975 | Zibritosky | 156/109 X |
| 3,939,556 | 2/1976 | Borel et al. | 29/631.1 |
| 4,297,401 | 10/1981 | Chern et al. | 350/343 X |
| 4,588,468 | 5/1986 | McGinty et al. | 29/564.1 X |
| 4,684,437 | 8/1987 | Donelon et al. | 156/643 |
| 4,718,967 | 1/1988 | Irie | 156/272.2 X |
| 5,037,780 | 8/1991 | Fujimoto et al. | 29/841 X |
| 5,098,501 | 3/1992 | Nishiguchi | 156/275.5 |

FOREIGN PATENT DOCUMENTS

| | | | |
|---|---|---|---|
| 0121833 | 10/1978 | Japan | 156/344 |
| 62-47146 | 2/1987 | Japan | 156/584 |
| 63-92038 | 4/1988 | Japan | 156/344 |

OTHER PUBLICATIONS

J. Opt. Soc. Am. B/vol. 3, No. 5, May 1986, pp. 792–795, P. E. Dyer et al., "Direct-Etching Studies of Polymer Films Using A 157-nm $F_2$ Laser".

"Ablative Photodecomposition: Action of Far-Ultraviolet (193 mm) Laser Radiation on Poly(ethylene terephthalate) Films", J. Am. Chem. Soc., Aug. 2, 1982, 104, 6784–6785, R. Srinivasan et al.

"Self-Developing Photoetching of Poly(ethylene terephthalate) Films by Far-Ultraviolet Excimer Laser Radiation", Appl. Phys. Lett., vol. 41, No. 6, Sep. 15, 1982, pp. 576–578, R. Srinivasan et al.

*Primary Examiner*—David A. Simmons
*Assistant Examiner*—Mark A. Osele
*Attorney, Agent, or Firm*—Oblon, Spivak, McClelland, Maier & Neustadt

[57] ABSTRACT

A method for separating bonded substrates which are prepared by facing a plurality of substrates and bonding the substrates by an adhesive features irradiating an energy beam on the bonding portions of the bonded substrates from above one of the bonded substrates to separate the one substrate and the other substrate. The energy beam has the property of being transmitted through the one substrate and of being absorbed into the adhesive.

6 Claims, 4 Drawing Sheets

METHOD FOR SEPARATING BONDED SUBSTRATES, IN PARTICULAR DISASSEMBLING A LIQUID CRYSTAL DISPLAY DEVICE

This application is a continuation of application Ser. No. 07/581,902, filed on Sep. 13, 1990, now abandoned.

BACKGROUND OF THE INVENTION

Field of the Invention

The present invention relates to a method for separating bonded substrates without damaging wiring such as an electrode formed on the substrates. More particularly, the present invention relates to a method for disassembling a liquid crystal display device.

Discussion of Background

The specification will describe the case of the bonded substrates which are used in a liquid crystal display device.

FIG. 4 is a perspective view showing the entire structure of a liquid crystal display device. FIG. 5 is a cross-sectional view taken along the line V—V of FIG. 4. In these figures, reference numeral 1 designates an opposite substrate made of a transparent glass substrate. Reference numeral 2 designates a main substrate made of a transparent glass substrate. Reference numeral 3 designates wiring which is formed on the opposite substrate. Reference numeral 4 designates wiring which is formed on the main substrate. Reference numeral 5 designates an adhesive which is made of polymer material and which is used to bond the opposite substrate to the main substrate. In this case, an epoxy adhesive is used. Reference numeral 6 designates spacers which are used to maintain a gap between the main substrate and the opposite substrate. In this case, the gap is 5 $\mu$m. Reference numeral 7 designates a liquid crystal. An adequate signal is applied to the wiring 3 and 4 to drive the liquid crystal. Driving the liquid crystal controls the transmission amount of light between the substrates 1 and 2 to function a display device. The liquid crystal driving system can be broadly classified into a simple matrix system and an active matrix system. The active matrix system which includes thin film transistors to individually drive picture elements has been recently getting dominant. The structure of the wiring 3 and 4 is different depending on the liquid crystal driving system. However, in consideration of the flexibility, the structure of the wiring is not essential. For these reasons, the structure of the wiring 3 and 4 is shown in a simplified manner in the accompanying drawings.

The manufacturing process of such a liquid crystal planar display device is broadly classified into a step wherein wiring is formed on the main substrate and the opposite substrate, and a step called the subsequent step wherein the main substrate and the opposite substrate are assembled by use of an adhesive, and a liquid crystal is injected into the gap formed between the main substrate and the opposite substrate. Besides faults in the electrical switching of the wiring and in the thin film transistors, the foreign material contamination in the space between the main substrate and the opposite substrate may cause a display deficiency in the liquid crystal display device. For the purpose of attaining a quick response and fine display in the liquid crystal drive, the gap between the main substrate and the opposite substrate has been recently getting gradually smaller. In some instances a foreign material having a size of a few micrometers can contaminate the liquid crystal to cause a display deficiency. As a result, the manufacturing environment where the subsequent step is carried out requires a high level of cleanliness. However, the control of a foreign material having a size of not greater than a few micrometers under the manufacturing environment is technically difficult. In addition, a decrease in the frequency of such foreign material contamination naturally has a limitation because the subsequent step includes machining such as cutting. In other words, the manufacture yield in the subsequent step has a significant effect on the manufacture yield of liquid crystal display devices.

In order to improve the manufacture yield of liquid crystal display devices, developing a technique for reducing defective products, as well as establishing the subsequent step wherein the frequency of foreign material contamination can be reduced, is quite important. Because the liquid crystal is sealed by the adhesive, it is impossible to remove the foreign material after completion of the subsequent step. In addition, it is remarkably difficult to find in the examination before the subsequent step the display deficiency due to the contamination by a fine foreign material. Such a display deficiency can not be found until completion of the subsequent step, i.e. until display can be done by a product. In the past, a method for separating such bonded substrates conventionally includes one wherein machining such as cutting the substrates is utilized, and one where the bonded substrates are exposed in a chemical to chemically weaken the polymer adhesive or to remove it. Because both methods are accompanied by damage to the wiring etc. formed on the substrates and therefore damage to the substrates themselves, there is a possibility that the display is not in order or assemblage is impossible when the substrates are reassembled after the separation to produce a display device. In this way, the conventional method can not carry out the separation and the reproduction in a suitable manner. Conventionally, the separation and the reproduction are not carried out to obtain a display device. Defective products which are caused by foreign material contamination and the like are discarded in the present circumstances.

As described above, developing a defective product reproducing technique is quite important as one of the resolutions to improve the manufacture yield of bonded substrates. However, the separation of the bonded substrates is carried out by the conventional methods as stated earlier, which makes reproduction after separation or disassembly impossible. Defective products are forced to be discarded. As a result, the manufacture yield has not been improved. This creates a problem where a method for separating bonded substrates without damaging the substrates, the wiring on them, and the like is developed in order to be able to reproduce defective product.

SUMMARY OF THE INVENTION

It is an object of the present invention to solve the problem, and to provide a method for separating bonded substrates and disassembling a liquid crystal display device wherein the bonded substrates can be separated or disassembled without causing any damage to the substrates or the wiring formed on them, whereby, in the case of e.g. a liquid crystal display device, substrates thus disassembled can be reused to obtain reproduced substrates which are not inferior in display characteristics.

The foregoing and other objects of the present invention have been attained by providing a method for separating bonded substrates which are prepared by facing a plurality of substrates and bonding the substrates by an adhesive, comprising irradiating an energy beam on the bonding portions of the bonded substrates from above one of the bonded substrates to separate the one substrate from the other substrate, the energy beam having the property of transmitting through the one substrate and of being absorbed into the adhesive.

As a result, defective bonded substrates can be separated without damaging the substrates and the wiring etc. formed on them, and the substrates thus separated can be reproduced and restored, thereby improving the manufacture yield.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
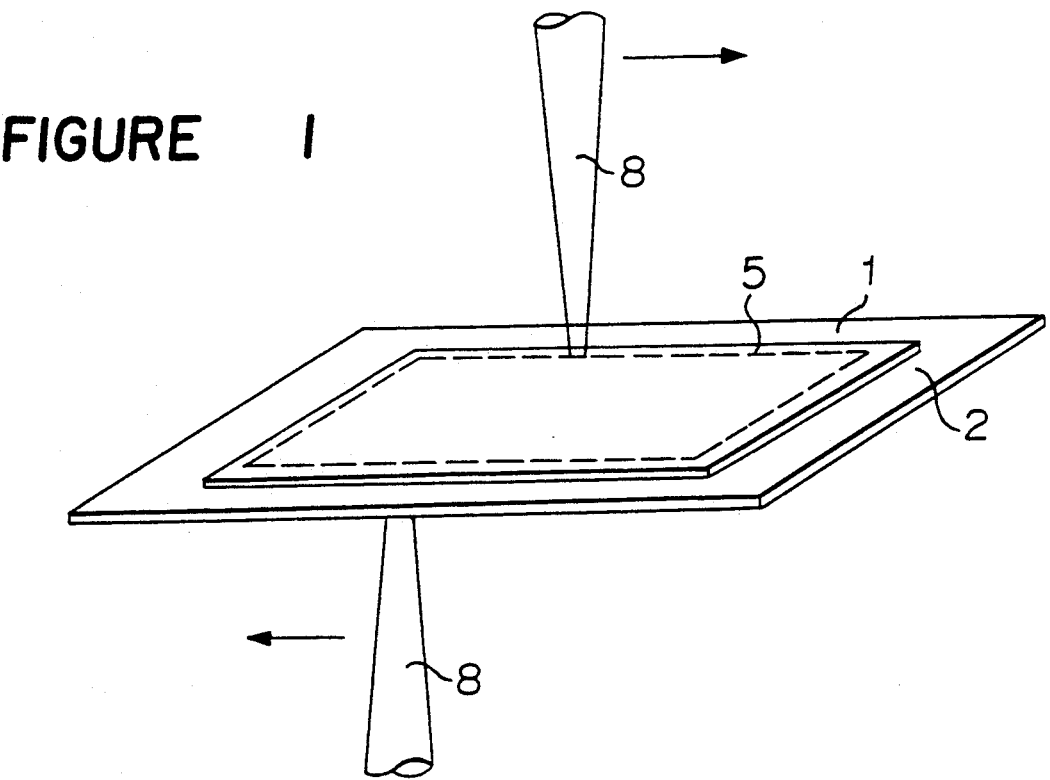
FIG. 1 is a schematic perspective view showing an embodiment of the method for disassembling a liquid crystal planar display device.
Figure 5:
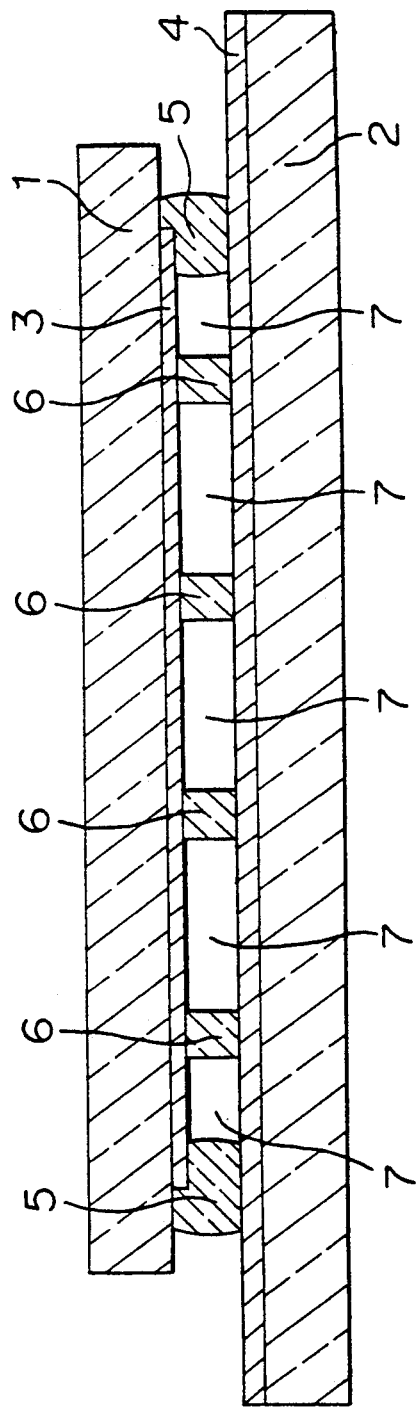
FIG. 5 is a cross-sectional view taken along the line V—V' of FIG. 4.

Referring now to the drawings, wherein like reference numerals designate identical or corresponding parts throughout the several views, and more particularly to FIG. 1 thereof, there is shown the case wherein bonding portions are irradiated by energy beams from the outer surfaces of bonded substrates (from the outsides of both bonded substrates). In FIG. 1, reference numeral 1 designates one of the bonded substrates which is an opposite substrate made of a transparent glass substrate in this embodiment. Reference numeral 2 designates the other substrate which is a main substrate made of a transparent glass substrate as well in this embodiment. Reference numeral 5 designates an adhesive which is made of a polymer material and which is used to bond the opposite substrate 1 to the main substrate 2. In this embodiment, an epoxy adhesive is used. Reference numeral 8 designates energy beams which are given by use of an ultraviolet excimer-laser (wavelength of 308 nm) in the embodiment. Arrows indicate the scanning directions of the energy beams 8. The energy beams 8 which are obtained by the excimer-laser have an excitement voltage of 25 KV, a repetition rate of 100 Hz and a beam diameter of 2 mm and are irradiated to and scanned on the adhesive 5 through the opposite substrate 1 and the main substrate 2 which are made of transparent glass substrates. On the other hand, the structure of the liquid crystal display device in section is shown in FIG. 5. As the material for the wiring 4, a compound oxide which mainly comprises indium, tin and oxygen is used. The compound oxide is called a transparent electrode which can transmit part of an ultraviolet ray. When the excimer-laser beams 8 are irradiated to the adhesive 5 through the opposite substrate 1 and the main substrate 2 which are bonded to have the structure as shown in section in FIG. 5, the bonding surfaces of the adhesive can be deteriorated to bring about separation into three parts, i.e., the opposite substrate 1, the adhesive 5 and the main substrate 2, allowing both substrates 1 and 2 to be disassembled without damaging the wiring 4 and the like. Because a laser, in particular an excimer-laser, whose beam wavelength is in the ultraviolet region, has a superior dry etching function to polymer material, research on drilling treatments for polymer material by use of such a laser is being actively pursued. The present application discloses for the first time that such a laser is significantly effective to separate parts bonded by the adhesive made of polymer material. The separation mechanism according to the present invention can not be explained in a clear manner because the bonding mechanism of adhesives has not been elucidated yet. The chemical connection between the adhesive and the substrates is thought to be cut or changed due to the irradiation of the excimer-laser, thereby allowing the adhesive and the substrates to be separated at the bonding surfaces.

The opposite substrate 1 and the main substrate 2 of the liquid crystal display device thus separated and disassembled do not have themselves and the wiring 4 formed on them subjected to deterioration and damage. As a result, after the separated substrates have been subjected to a suitable cleaning process, the substrates can be refabricated to act as a liquid crystal display device. In this way, defective products can be reproduced and restored by separating or disassembling the bonded substrates of the defective products without damaging the substrates or the wiring on them, thereby improving the manufacture yield.

Figure 2:
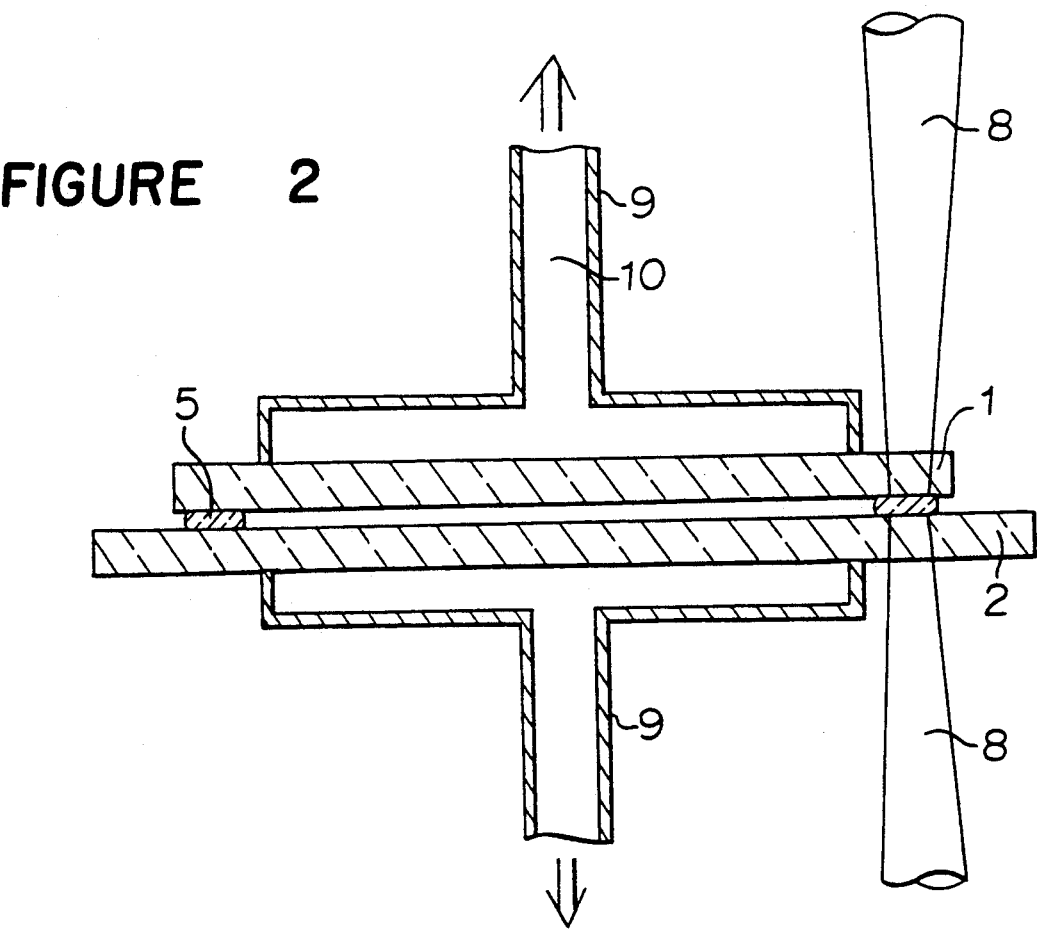
FIG. 2 is a cross-sectional view showing the structure of a separation device which is used in another embodiment of the present invention.

FIG. 2 is a cross-sectional view showing the structure of the separation device of another embodiment of the present invention. In FIG. 2, reference numeral 9 designates jigs which can hold the opposite substrate 1 and the main substrate 2 by suction. Reference numeral 10 designates a portion where a vacuum is formed in the jigs. The jigs 9 can be utilized to give shearing forces to the opposite substrate 1 and the main substrate 2 by a slide or rotation after the laser beam 8 has been irradiated or while the laser beam 8 is being irradiated, thereby allowing the opposite substrate 1, the main substrate 2 and the adhesive 5 to be separated at their bonding surfaces.

Figure 3:
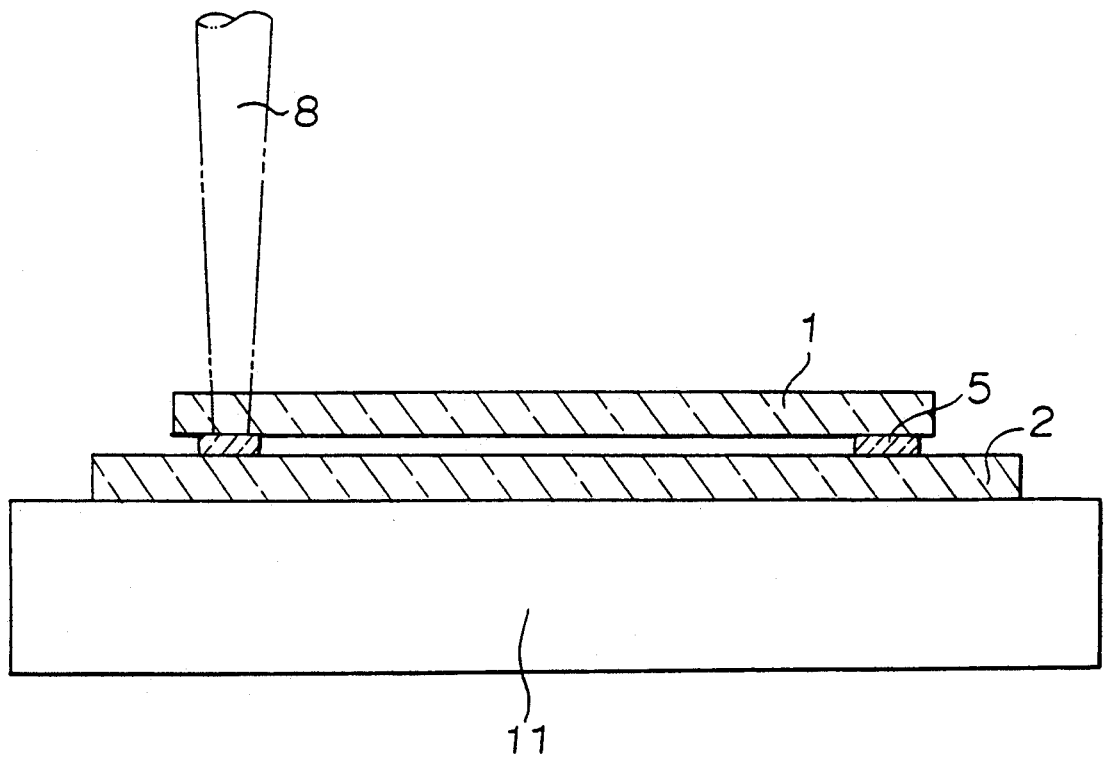
FIG. 3 is a cross-sectional view showing the structure of a separation device which is utilized in a further embodiment of the present invention.
Figure 4:
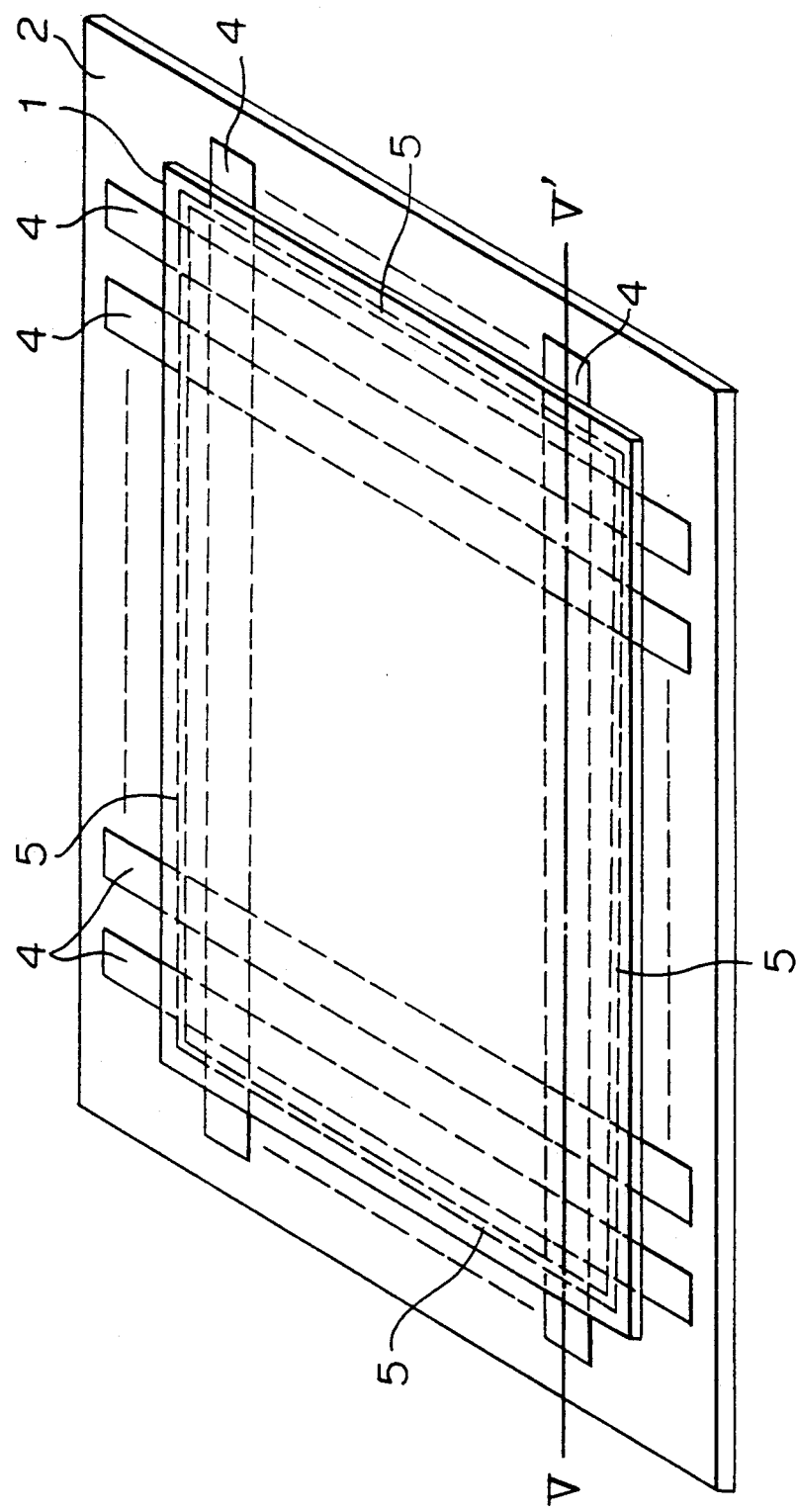
FIG. 4 is a perspective view showing the liquid crystal planar display device.

FIG. 3 is a cross-sectional view showing the structure of the separation device of a further embodiment of the present invention. In this embodiment, the laser beam 8 is irradiated from above the opposite substrate 1 as one of the substrates. In FIG. 3, reference numeral 11 designates a heating device which is a heater in the embodiment. When the opposite substrate 1 or the main substrate 2 is heated by the heater 11 after or during irradiation of the laser beam 8, thermal stress is generated due to the temperature difference in the substrates to separate the opposite substrate 1 and the main substrate 2.

Although with regard to the embodiments shown, the case wherein the excimer-laser is used as an ultraviolet laser which can provide an energy beam having the property of transmission in the substrates and absorption in the adhesive has been explained, the laser source is not be limited to the excimer-laser, and other lasers, e.g. an Nd-YAG laser, an Xe laser, an Ar laser, a $CO_2$ gas laser, a copper vapor laser are applicable to the present invention because these lasers have similar functions. In addition, the energy beam is not limited to the laser, and it is clear that other energy beams having similar functions can be utilized. When wiring and the like is formed on the bonding portion, the energy beam which is used in the present invention is one that can transmit the wiring.

Although the explanation on the embodiments shown has been made with respect to the case wherein the epoxy type polymer adhesive is used as the adhesive, the adhesive which is used in the present invention is not limited to such types of adhesive. Other polymer adhesives such as acrylic, polyimide, phenolic and urethane adhesives are also applicable to the present invention. In addition, inorganic adhesives are also applicable.

Although the explanation on the embodiments shown has been made in reference to the case wherein the bonding portions lie at the peripheral portions of the bonded substrates, the bonding portions of the bonded substrates, whether the bonding portions lie at the central portions of the bonded substrates or other portions, can be separated in accordance with the present invention. This is because the present invention irradiates an energy beam from above the bonded substrates to separate them.

Although the explanation on the embodiments shown has been made for the case of the liquid crystal display device, it is clear that the present invention is applicable to other bonded substrates which are prepared by bonding a plurality of substrates (the number of the substrates is not restricted to two). The discreet substrates thus separated or disassembled do not have themselves and wiring etc. formed on them deteriorated. The separated or disassembled substrates can be refabricated after a suitable cleaning process to function in a proper manner. In this way, the present invention allows defective products to be separated in a reproducible and restorable manner, thereby improving the manufacture yield.

Obviously, numerous modifications and variations of the present invention are possible in light of the above teachings. It is therefore to be understood that within the scope of the appended claims, the invention may be practiced otherwise than as specifically described herein.

What is claimed is:

1. A method for separating bonded substrates which are prepared by facing a plurality of substrates and bonding the substrates by an adhesive, comprising the steps of:
    generating a laser beam by an excimer laser, said laser beam having a wavelength in an ultraviolet region;
    irradiating said laser beam onto portions of the bonding adhesive of the bonded substrates from above one of the bonding adhesive and separate the plurality of substrates, the laser beam having the property of being transmitted through the one substrate and of being absorbed into the adhesive, wherein the adhesive is made of a polymer material.

2. A method according to claim 1, wherein the bonded substrates are used to form a liquid crystal display device.

3. A method according to claim 1, further comprising the steps of:
    holding the bonded substrates by suction; and
    generating a shearing force to the bonded substrates after completion of the irradiation by the laser beam to separate the bonded substrates.

4. A method according to claim 1, further comprising the steps of:
    holding the bonded substrates by suction; and
    generating a shearing force to the bonded substrates during the irradiation by the laser beam to separate the bonded substrates.

5. A method according to claim 1, further comprising the steps of:
    heating at least one of the bonded substrates after completion of the irradiation by the laser beam to generate thermal stress in it, thereby separating the bonded substrates.

6. A method according to claim 1, further comprising the steps of:
    heating at least one of the bonded substrates during the irradiation by the laser beam to generate thermal stress in it, thereby separating the bonded substrates.

* * * * *